United States Patent [19]
Stephenson et al.

[11] 3,913,862
[45] Oct. 21, 1975

[54] VEHICLE SENSITIVE RETRACTOR WITH UNIVERSAL DOME PENDULUM

[75] Inventors: Robert L. Stephenson, Sterling Heights; Robert C. Pfeiffer, Rochester; Yogendra Singh Loomba, Washington, all of Mich.

[73] Assignee: Allied Chemical Corporation, New York, N.Y.

[22] Filed: July 10, 1974

[21] Appl. No.: 487,430

[52] U.S. Cl. ............................................ 242/107.4
[51] Int. Cl.² ......................................... A62B 35/00
[58] Field of Search .. 242/107.4–107.6; 280/150 SB; 297/386–388

[56] References Cited
UNITED STATES PATENTS

| | | | |
|---|---|---|---|
| 2,650,655 | 9/1953 | Neahr et al. | 242/107.4 X |
| 2,845,234 | 7/1958 | Cushman et al. | 242/107.4 |
| 3,552,676 | 1/1971 | Weber | 242/107.4 |
| 3,825,205 | 7/1974 | Takada | 242/107.4 |
| 3,838,831 | 10/1974 | Bell | 242/107.4 |

*Primary Examiner*—Leonard D. Christian
*Attorney, Agent, or Firm*—John P. Kirby, Jr.; Jonathan Plaut

[57] ABSTRACT

The vehicle sensitive retractor has a pendulum assembly which includes a pendulum dome. A support for the pendulum assembly includes a substantially cylindrical support member having a substantially circular line of contact at its upper end upon which the pendulum dome is disposed. Prior to actuation, the pendulum assembly has an infinite variety of operable static positions to which the pendulum assembly is adjustable according to the position in which the retractor is oriented by virtue of installation in the vehicle. As a result, the retractor may be tilted for installation without having to redesign the pendulum assembly and support. An actuating means is disposed above the pendulum dome. The actuating means is disposed in an unlocked position when the pendulum assembly is in any one of its infinite variety of operable static positions. The actuating means is moved to a locked position by the pendulum assembly during emergency situations to lock a reel and prevent further unwinding of a safety belt from the reel.

5 Claims, 4 Drawing Figures

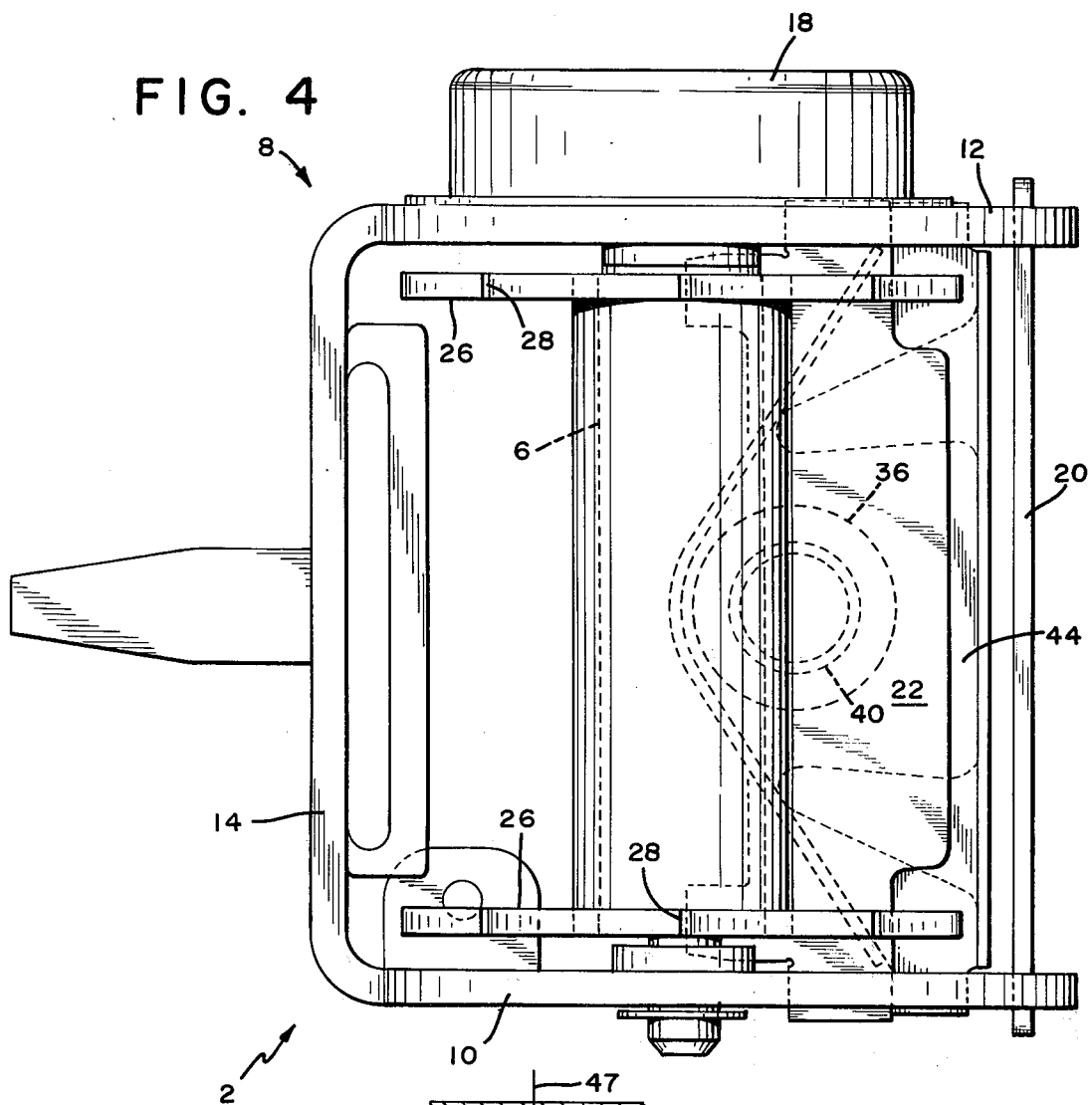
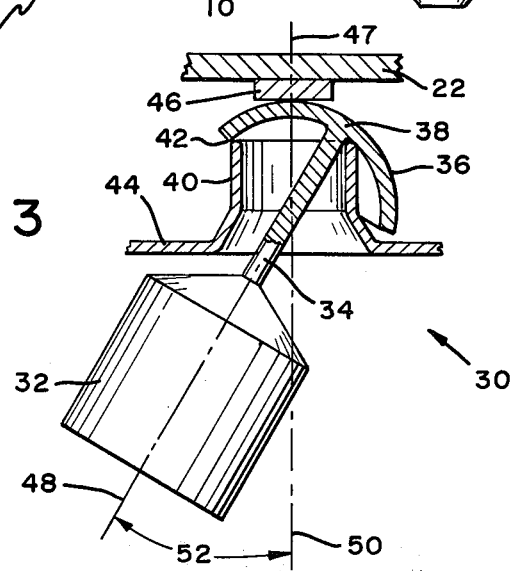

VEHICLE SENSITIVE RETRACTOR WITH UNIVERSAL DOME PENDULUM

BACKGROUND OF THE INVENTION

1. Field of the Invention

This invention relates to safety belt retractors for occupants of vehicles, such as automobiles. More particularly, this invention relates to an inertia responsive safety belt retractor which is vehicle-sensitive. Such a retractor is responsive to acceleration, deceleration or change in orientation of the vehicle, which may result from cornering, braking or overturning of the vehicle. In response thereto, the retractor locks to prevent further withdrawal of the safety belt. Still more particularly, this invention relates to an improved, universal inertia mechanism and support assembly which allow the retractor to be placed in a variety of positions within the vehicle.

2. Description of the Prior Art

Vehicle sensitive safety belt retractors have been recently developed which should significantly decrease the number of fatalities and serious injuries resulting from motor vehicle accidents. Most of these retractors use a vehicle sensitive mechanism having a pendulum assembly. Typically, such retractors also include a belt reel which is continually biased in a retracting direction and a pawl which is engagable with a ratchet wheel on the belt reel. When the pendulum assembly is displaced from its normally vertical position by acceleration, deceleration or change in orientation of the vehicle, the pendulum assembly moves the pawl into engagement with the ratchet wheel, preventing further withdrawal of the belt. U.S. patent application Ser. No. 312,534 filed Dec. 6, 1972 in the name of Lon E. Bell discloses an example of such a retractor.

It is important for the pendulum assembly to be in a substantially vertical position prior to actuation by acceleration, deceleration or change in orientation of the vehicle. It is desirable to have an improved, universal inertia mechanism and support in which the pendulum assembly is adjustable and does not need to be redesigned for different vehicles in order to have the pendulum assembly disposed vertically in its static position prior to actuation, so that the safety belt can be moved without locking the belt reel. This is desirable because the retractor needs to be mounted in various positions and orientations within different vehicles. Sometimes the retractor needs to be turned partly on its side.

SUMMARY OF THE INVENTION

The retractor of this invention is vehicle-sensitive and inertia-operated. The retractor has a reel for winding the safety belt adapted to lock and thereby restrain an occupant of a vehicle during emergency situations and having means for locking the reel, an improved inertia mechanism, an improved support mounted on the retractor for supporting the inertia mechanism and an improved actuating means responsive to the inertia mechanism for operating the means for locking the reel. The inertia mechanism is a pendulum assembly which includes a pendulum dome in contact with the actuating means. The pendulum assembly has an infinite variety of operable static positions to which the pendulum assembly is adjustable according to the position in which the retractor is oriented by virtue of installation in the vehicle. The support for the inertia mechanism includes a substantially cylindrical support member having a substantially circular line of contact at its upper end upon which the pendulum dome is disposed. The actuating means is disposed above the pendulum dome and has an unlocked position and a locked position. The actuating means is disposed in its unlocked position when the pendulum assembly is in any one of its infinite variety of operable static positions. The actuating means is moved to its locked position by the pendulum assembly during emergency situations to engage the pawl in the ratchet and thereby lock the reel to prevent further unwinding of the belt. Typically, the reel locking means includes one or more ratchet wheels and a pawl, although other reel locking means may also be used. The retractor and the pendulum assembly each have a longitudinal axis. The static position of the pendulum assembly is adjustable in any direction from a static position wherein the longitudinal axis of the pendulum assembly is disposed at an angle of approximately 0° to an angle of approximately 30° with reference to the longitudinal axis of the retractor. The cylindrical support member also has a longitudinal axis which is disposed substantially parallel to the longitudinal axis of the retractor. The retractor further includes a support structure including two parallel side walls and a back wall. The longitudinal axis of the cylindrical support member is disposed substantially parallel to the side walls and the back wall.

The inertia mechanism and support are universal and unique because they do not have to be redesigned for use in different vehicles in order to have the pendulum assembly disposed vertically for the purpose of allowing the retractor to remain unlocked in normal operation. If the retractor is turned partly on its side, that is, tilted for installation, the static position of the pendulum assembly is adjustable to such tilted installation of the retractor.

DESCRIPTION OF THE DRAWINGS

FIG. 3 is a cross-sectional view of part of FIG. 2 along the lines 3—3.

FIG. 4 is a top view of FIG. 2.

DETAILED DESCRIPTION

Figure 1:
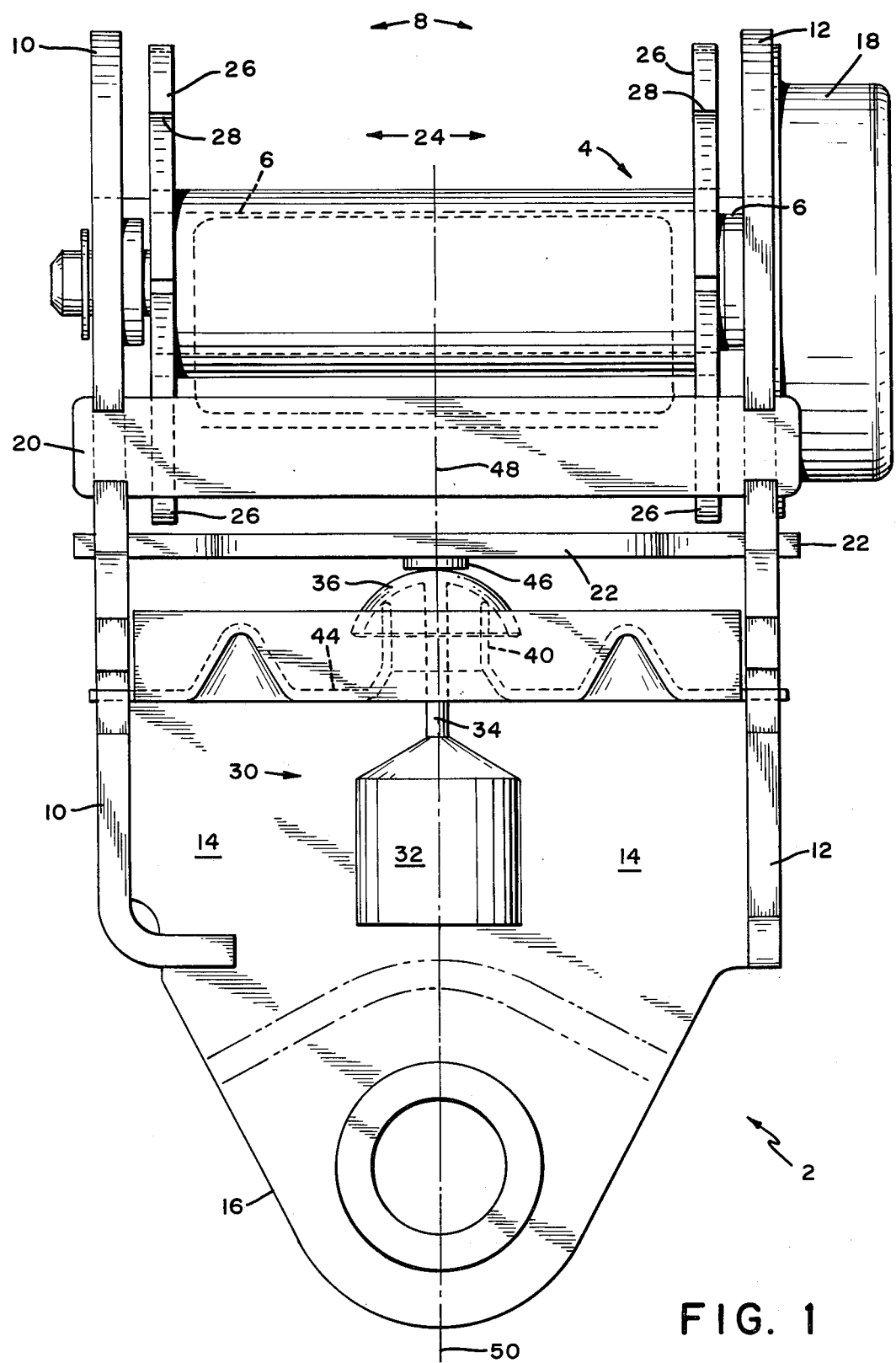
FIG. 1 is a front elevational view of the retractor of this invention.
Figure 2:
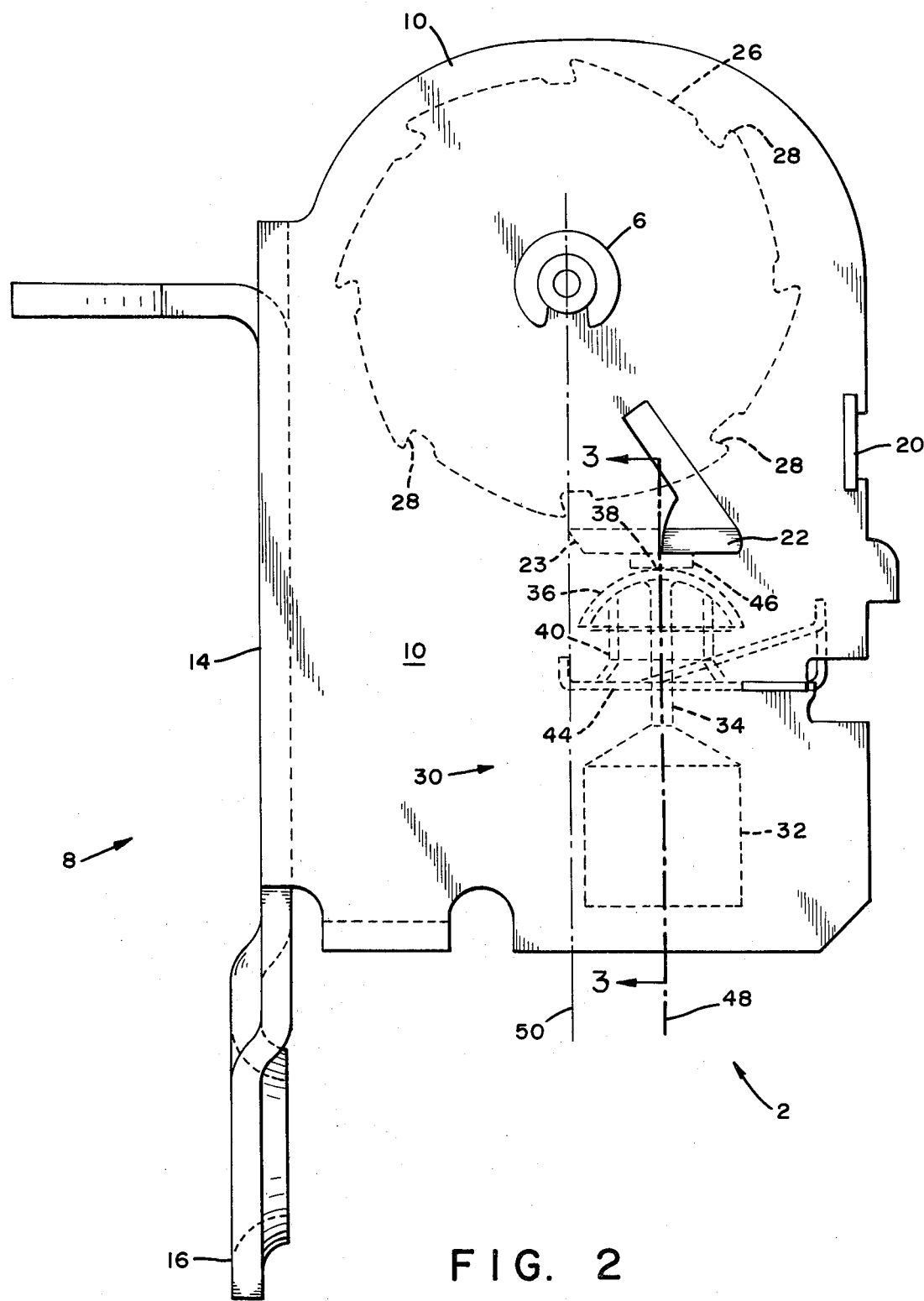
FIG. 2 is a side view of FIG. 1.

Referring to FIGS. 1, 2 and 4, the retractor, referred to generally by the numeral 2, has a reel means 4, including a reel shaft 6 rotatably mounted on a support means 8. The support means 8 is a load bearing member and includes two side walls 10 and 12 and a back wall 14. The support means 8 also includes a mounting means 16 in the form of a rigid extension adapted to be bolted or otherwise secured to an anchorage point in a vehicle (not shown).

A belt (not shown) is adapted to be attached to the reel shaft 6 for winding and unwinding thereon. The reel means 4 includes a biasing means, such as a tension return spring, inside a housing 18, which urges the reel shaft 6 to turn in a winding direction. The winding direction of the reel shaft 6 retracts the belt into the retractor 2. The opposite unwinding direction of the reel shaft 6 allows withdrawal of the belt from the retractor 2.

The two side walls 10 and 12 of the support structure 8 are disposed substantially parallel to one another and substantially perpendicular to the back wall 14. The support structure 8 also includes a cross member 20 extending between the side walls 10 and 12 and at the opposite side of the side walls 10 and 12 from the back wall 14.

The retractor 2 further includes a means for locking the reel means 4, such as a pawl 22 and a ratchet means 24. The ratchet means 24 includes at least one ratchet wheel 26, and preferably, two ratchet wheels 26. The ratchet wheels 26 have ratchet teeth 28 (FIG. 2) on their outer circumferences and are fixedly mounted on the reel shaft 6.

The pawl 22 is pivotally mounted on the side walls 10 and 12 and extends between the side walls 10 and 12. The pawl 22 is adapted to pivot from an unlocked position, shown in FIG. 2 by dashed lines, to a locked position. In the locked position, the pawl 22 is pivoted into engagement with the ratchet wheels 26.

The retractor 2 further includes an inertia mechanism, a support for the inertia mechanism and an actuating means, all of which are adapted to cooperate to actuate the pawl from its unlocked position to its locked position during dangerous situations. The inertia mechanism, support and actuating means, may be mounted inside the retractor, as illustrated in the drawings, or may be mounted outside the retractor on the outer side of one of the side walls 10 of the support structure 8. The inertia mechanism is a pendulum assembly 30 which is best shown in FIG. 3. The pendulum assembly 30 includes a pendulum weight 32, a pendulum rod 34 and a pendulum dome 36. The pendulum dome 36 is substantially hemispherical and has an open bottom, a hollow interior and a central portion 38 at its top. The pendulum rod 34 has an upper end and a lower end. The upper end of the pendulum rod 34 is connected to the interior of the central portion 38 of the dome 36. The lower end of the pendulum rod 34 is connected to the pendulum weight 32.

The support for the pendulum assembly 30 includes a substantially cylindrical support member 40 having a substantially circular line of contact 42, such as a circular knife edge, at its upper end upon which the pendulum dome 36 is disposed. The support also includes a base 44 for the support member 40. The base 44 is disposed at the lower end of the support member 40 and preferably is integral with the support member 40. The support member 40 also has a longitudinal axis 47 which is disposed approximately parallel to the longitudinal axis 50 of the retractor and substantially parallel to the side walls 10 and 12 and the back wall 14. The actuating member 46 is disposed above the pendulum dome 36, between the pendulum dome 36 and the pawl 22. Preferably, the actuating member 46 is a circular disc attached to the lower side of the pawl 22 and in contact with the dome 36. If the pendulum assembly 30 and support member 40 are mounted on the outer side of one of the side walls 10 of the support structure 8, the pawl 22 must extend through such side wall 10 to be actuated by the actuating member 46 or the pawl and a ratchet wheel may be mounted on the outer side of the side wall.

The pendulum assembly 30 has a longitudinal axis 48 passing through the central portion 38 of the pendulum dome 36. The longitudinal axis 48 of the pendulum assembly 30 is substantially parallel to and coincident with the longitudinal axis of the pendulum rod 34. The static position of the pendulum assembly 30 is adjustable in any direction from a static position wherein the longitudinal axis 48 of the pendulum assembly 30 is disposed at an angle of approximately 0° (FIGS. 1 and 2) to an angle 52 of approximately 30° (FIG. 3) with reference to the longitudinal axis 50 of the retractor 2, or any angle between 0° and approximately 30°.

When the retractor 2 is disposed in the vehicle so that the longitudinal axis 50 of the retractor 2 is substantially vertical, the pendulum assembly 30 assumes an operable static position with the angle between the longitudinal axis 48 of the pendulum assembly 30 and the longitudinal axis 50 of the retractor 2 being 0°. Referring to FIG. 3, when the retractor 2 has been tilted for installation in a vehicle so that the longitudinal axis of the retractor 2 is at an angle 52 of up to approximately 30° with the vertical plan, the pendulum 30 assumes an operable static position with the longitudinal axis 48 of the pendulum assembly 30 being disposed at an angle of up to approximately 30° with reference to the longitudinal axis of the retractor 2.

The pendulum assembly 30 is capable of adjusting automatically to an infinite variety of operable static positions. In all of the infinite variety of operable static positions to which the pendulum assembly 30 is adjustable, the longitudinal axis 48 of the pendulum assembly 30 adjusts to a position approximately parallel to the vertical plane. It is the longitudinal axis 50 of the retractor 2 that assumes an angle with reference to the vertical plane. This adjustment of the pendulum assembly 30 takes place by means of the interior surface of the dome 36 sliding in any direction with reference to the circular line of contact 42, without moving the pawl actuating member 46 from its unlocked position. In practice, because of friction between the circular line of contact 42 and the interior surface of the dome 36, and other forces, adjustment of the pendulum assembly 30 does not begin until the angle 52 exceeds approximately 12°. Adjustment of the pendulum assembly 30 takes place when the angle 52 is between approximately 12° and 30°. During normal operation of the retractor 2, when the vehicle is not in a dangerous situation, the pendulum dome 36 continues to rest on the circular line of contact 42 in any one of its infinite variety of operable static positions. During normal operation of the retractor 2, when the vehicle is not in a dangerous situation, the pawl actuating member 46 rests in its unlocked position on top of the pendulum dome 36. The pawl actuating member 46 is connected to the underside of the pawl 22 and the pawl 22 remains in its unlocked position. FIG. 3 shows the pendulum assembly 30 in its extreme static position in which it has pivoted about the interior curvature of the dome 36 by sliding on the circular line of contact 42.

Under dynamic conditions, when the acceleration, deceleration or change in orientation of the vehicle exceeds a predetermined magnitude, the pendulum dome 36 pivots on the circular line of contact 42 and is lifted up and off the circular line of contact 42. Such movement of the pendulum dome 36 lifts the actuating member 46, which in turn lifts the engaging side 23 (FIG. 2) of the pawl 22, causing the pawl 22 to pivot into engagement with the ratchet wheels 26. The pendulum assembly 30 and the support member 40 having circular line of contact 42, provide a simple, but effective, vehicle-sensitive, inertia-operated mechanism adapted to lock the retractor 2 and thereby restrain an occupant of the vehicle during emergency situations. As a result, when the vehicle is subjected to sudden braking, cornering or overturning, for example, the pendulum assembly 30 locks the ratchet wheels 26 and prevents the belt from being withdrawn any further from the retractor 2, thereby restraining the occupant of the vehicle wearing the safety belt. The pendulum assembly 30 and support member 40 are highly reliable in operation and inexpensive to manufacture. A typical location for this retractor is on the back of a seat where the angle of orientation of the retractor changes with the position of the seat.

We claim:

1. In a vehicle-sensitive, inertia-operated safety belt retractor with a reel for winding the safety belt adapted to lock and thereby restrain an occupant of a vehicle during emergency situations and having means for locking the reel, an inertia mechanism, a support mounted on said retractor for supporting the inertia mechanism, and an actuating means responsive to said inertia mechanism for operating the means for locking the reel, the improvement wherein:

said inertia mechanism is a pendulum assembly which includes a pendulum dome in contact with said actuating means, said pendulum assembly having an infinite variety of operable static positions to which said pendulum assembly is adjustable according to the position in which the retractor is oriented by virtue of installation in the vehicle; said pendulum assembly being actuated by forces exceeding a predetermined magnitude resulting from a sudden change in the motion or orientation of the vehicle;

said support for said inertia mechanism includes a substantially cylindrical support member having substantially circular line of contact at its upper end upon which said pendulum dome is disposed, said pendulum assembly requiring a force exceeding a predetermined magnitude to lift a part of the pendulum dome up and off a part of said support member before said pendulum assembly will cause said locking means to lock the reel; and said actuating means is disposed above said pendulum dome, said actuating means having an unlocked position and a locked position, said actuating means being disposed in said unlocked position when said pendulum assembly is in any one of said infinite variety of said operable static positions, said actuating means being moved to said locked position by said pendulum assembly during emergency situations to lock said reel and prevent further unwinding of said belt, said actuation means operating directly on the means for locking the reel and said support assembly having a compact configuration, sufficiently compact for said pendulum assembly and said support for said inertia mechanism to be mounted either within said retractor or outside said retractor.

2. The vehicle-sensitive, inertia-operated safety belt retractor according to claim 1 wherein:

said retractor has a longitudinal axis;

said pendulum assembly has a longitudinal axis; and said pendulum assembly is adjustable in any direction from a static position wherein said longitudinal axis of said pendulum assembly is disposed at an angle of approximately 0° to an angle of approximately 30° with reference to the longitudinal axis of said retractor.

3. The vehicle-sensitive, inertia-operated safety belt retractor according to claim 1 wherein:

said retractor further includes a support structure including two parallel side walls and a back wall, said side wall being disposed approximately perpendicular to said back wall; and said cylindrical support member has a longitudinal axis disposed substantially parallel to said side walls and said back wall and substantially parallel to the longitudinal axis of said retractor.

4. The vehicle-sensitive, inertia-operated safety belt retractor according to claim 1 wherein:

said pendulum assembly further includes a pendulum weight and a pendulum rod;

said pendulum dome is substantially hemispherical, having an open bottom, a hollow interior and a central portion at its top; and said pendulum rod has an upper end and a lower end, said upper end of said pendulum rod being connected to said central portion of said dome, said lower end of said pendulum rod being connected to said pendulum weight.

5. The vehicle-sensitive, inertia-operated safety belt retractor according to claim 1 wherein: said longitudinal axis of said pendulum assembly passes through said central portion of said dome and is substantially coincident with the longitudinal axis of said pendulum rod.

* * * * *